April 29, 1924.

A. H. PAPE

Re. 15,827

MEANS FOR CONVERTING COLLAPSIBLE TOPS OF AUTOMOBILES INTO CLOSED TOPS

Original Filed Oct. 27, 1919 3 Sheets-Sheet 1

INVENTOR
A. H. PAPE

BY Wright Chain

ATTYS.

April 29, 1924. Re. 15,827

A. H. PAPE

MEANS FOR CONVERTING COLLAPSIBLE TOPS OF AUTOMOBILES INTO CLOSED TOPS.

Original Filed Oct. 27, 1919 3 Sheets-Sheet 2

INVENTOR
A. H. PAPE
BY Wright & Chain
ATTYS.

April 29, 1924. Re. 15,827

A. H. PAPE

MEANS FOR CONVERTING COLLAPSIBLE TOPS OF AUTOMOBILES INTO CLOSED TOPS

Original Filed Oct. 27, 1919 3 Sheets-Sheet 3

INVENTOR
A. H. PAPE
BY Wright & Chain
ATTYS.

Reissued Apr. 29, 1924. Re. 15,827

UNITED STATES PATENT OFFICE.

AUGUST H. PAPE, OF KENTFIELD, CALIFORNIA, ASSIGNOR, BY DIRECT AND MESNE ASSIGNMENTS, TO ALLAN LARKINS, OF SAN FRANCISCO, CALIFORNIA, DOING BUSINESS AS LARKIN TOP & NOVELTY CO.

MEANS FOR CONVERTING COLLAPSIBLE TOPS OF AUTOMOBILES INTO CLOSED TOPS.

Original No. 1,363,908, dated December 28, 1920, Serial No. 333,441, filed October 27, 1919. Application for reissue filed May 1, 1922. Serial No. 557,812.

*To all whom it may concern:*

Be it known that I, AUGUST H. PAPE, a citizen of the United States, residing at Kentfield, in the county of Marin and State of California, have invented new and useful Improvements in Means for Converting Collapsible Tops of Automobiles into Closed Tops, of which the following is a specification.

The object of the present invention is to provide means for converting a collapsible top of an automobile into a closed top.

Figure 1:
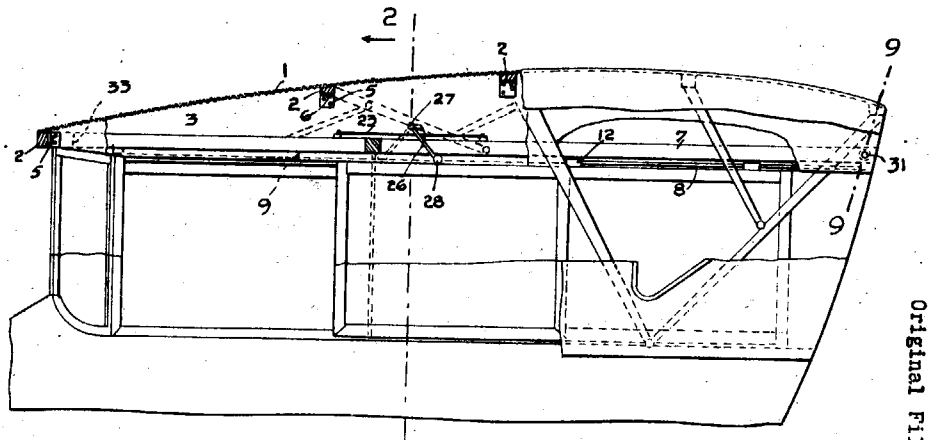
Figure 2:
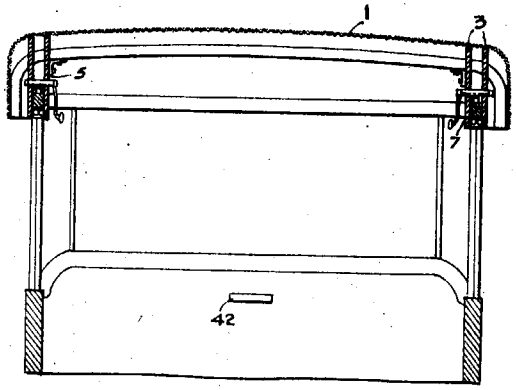
Figure 3:
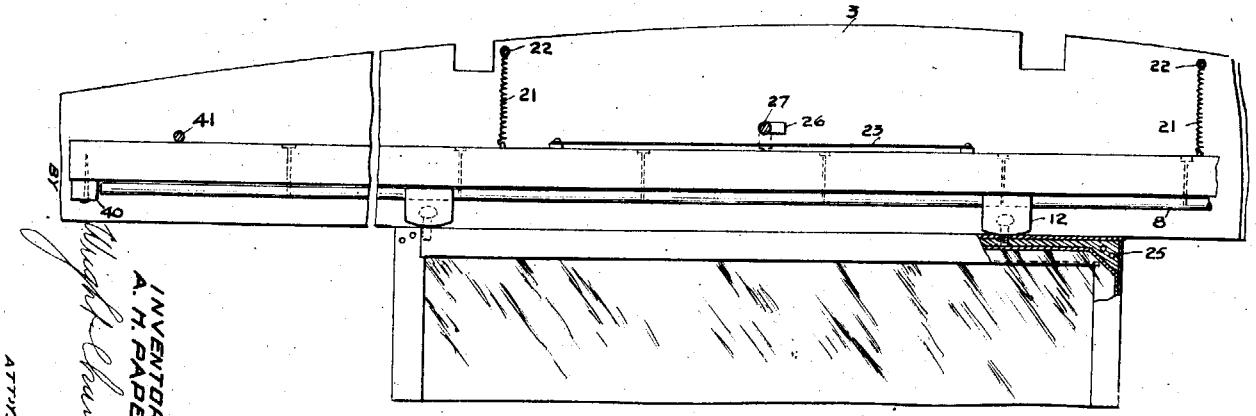
Figure 4:
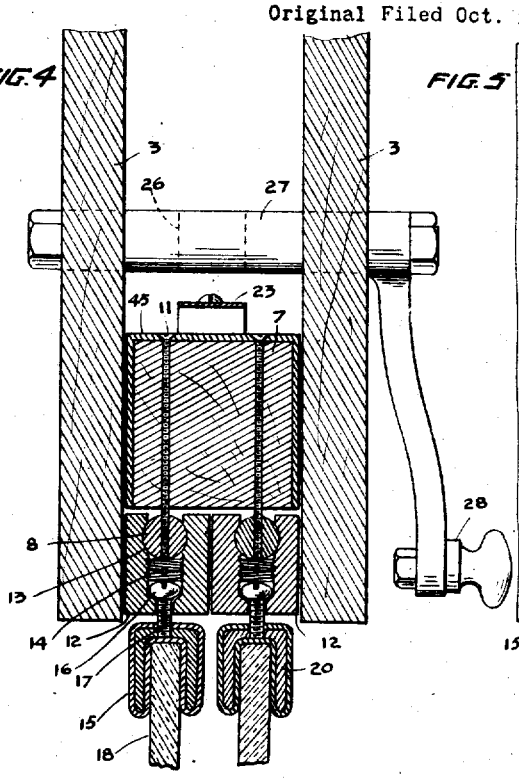
Figure 5:
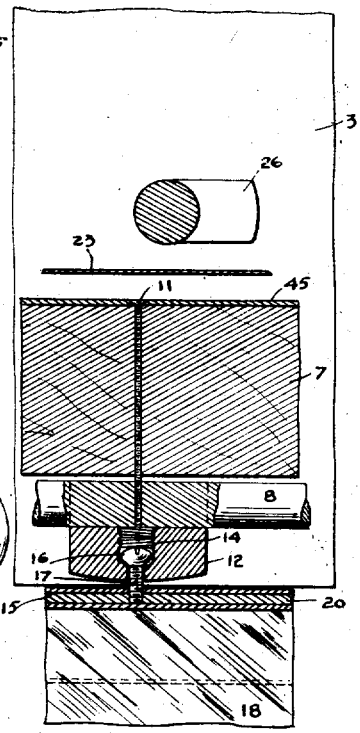
Figure 6:
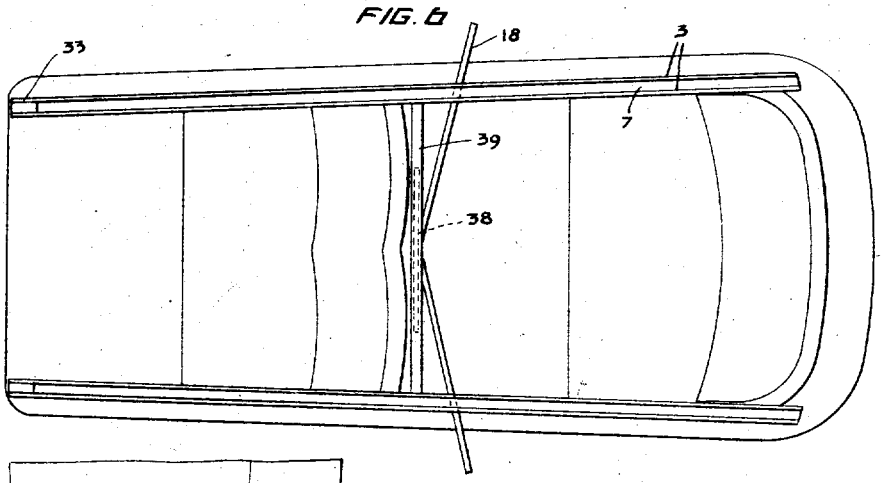
Figure 7:
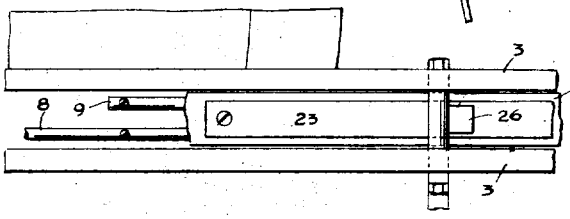
Figure 8:
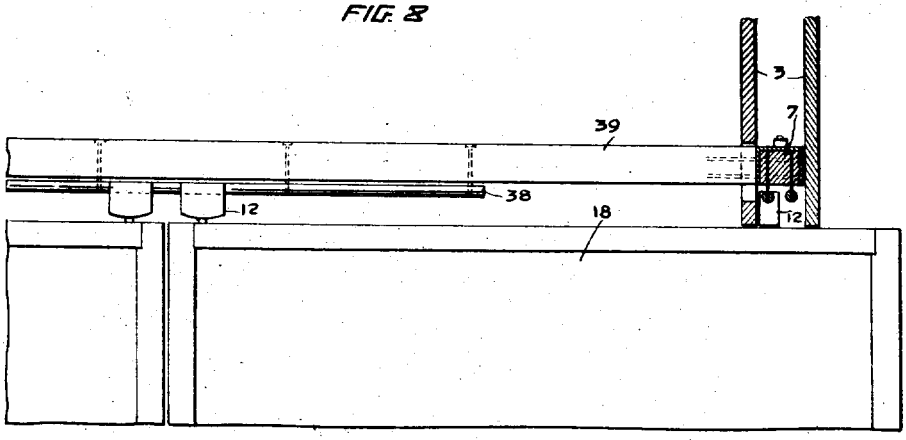
Figure 9:
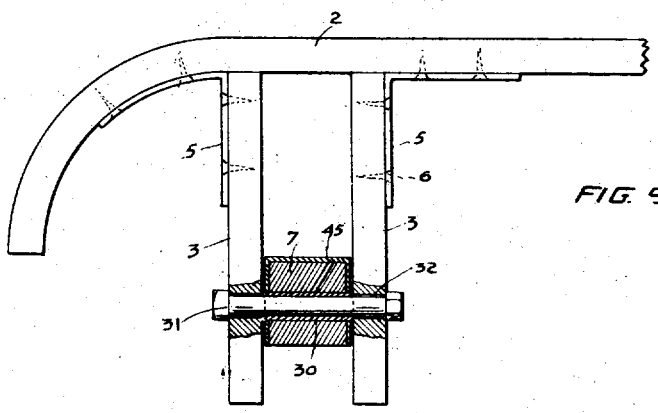
Figure 10:
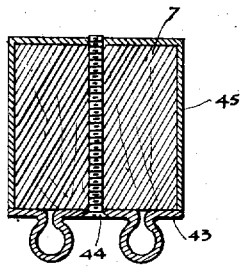

In the accompanying drawings, Figure 1 is a broken side view of the upper portion of an automobile; Fig. 2 is a cross section thereof on the line 2—2 of Fig. 1 looking forwardly; Fig. 3 is a broken side view of a part of the apparatus which I use for converting the top of the automobile into a closed top; Fig. 4 is an enlarged sectional view of a portion of Fig. 2; Fig. 5 is a sectional view of parts shown in Fig. 4, looking at right angles to Fig. 4; Fig. 6 is a plan view of the automobile top, the cover being removed, showing also the arrangement whereby the windows are converted into a rear wind shield; Fig. 7 is a plan view of a portion of said apparatus; Fig. 8 is a partial transverse section thru the car showing the window converted into a rear wind shield; Fig. 9 is a broken rear view of a rear portion of the car; Fig. 10 is a sectional view of a modified form of track.

Referring to the drawing, 1 indicates the cloth top of an open car and 2 the bows thereof. Secured within said top, on each side, and extending parallel with the side of said top, is a pair of boards or plates 3, forming the foundation of my improved means for conversion. The lower edges of said plates are straight and horizontal and the upper edges thereof are curved to conform to the longitudinal curvature of the top of the car. Said plates are secured to the bows 2 by angle irons 5 and screws 6. Between each pair of plates is a metal flange 45 stiffening a longitudinal presser bar 7, which as shown may support tracks or rails 8, said tracks consisting of round rods extending longitudinally of the car.

One of said tracks or rails extends the whole length of the car, and the other extends forwardly just beyond the front window of the car, as shown at 9 in Figs. 1 and 7. Said rails are secured to said presser bar by long screws 11, screwed through said presser bar and into said rods. Upon said rails can travel slide blocks 12, each formed at the top with a longitudinally extending recess 13 curved concavely on its opposite sides to fit snugly against the convex sides of the rails.

Each block is formed with a central socket extending upwardly from its lower side and meeting said longitudinally extending recess and threaded in its upper portion and in the threaded upper portion of said socket is screwed a plug 14. The under side of said plug bears against the upper surface of the head 16 of a screw 17, said screws being placed in said socket from the top and screwed in the frame 15 of a window 18, the lower side of said frame being slidable upon the upper edge of the car body.

Springs 21 are secured to the presser bar and to pins 22 extending between the plates and normally raise said presser bar, thereby raising the rails and also the windows by reason of the heads of the screws being confined within the sockets. It results from this construction that, when the window is being moved, its lower edge is free from the upper edge of the car body. When, however, it has been moved to the position desired, the presser bar is depressed to rest upon the edge of the car body by means of an arm 26 (Figs. 3 and 5) extending from a shaft 27 mounted in the pair of boards or plates and carrying a handle 28 convenient for operation by a person within the car. Upon turning said handle, said arm is depressed, pressing down upon the center portion of a long spring 23 attached at its ends to the presser bar 7, thereby providing resilient pressure on said presser bar and prevent rattling and equalizing the pressure, and pressing the windows down upon the edge of the car body so that said windows are held firmly in position.

At the rear end, the plates of each pair are spaced from each other by a sleeve 30 around a bolt 31 which passes through a vertically elongated hole 32 in the rear part of the presser bar, to allow the support to move freely vertically while preventing its longitudinal movement.

At the front end, the plates of each pair are spaced from each other by a block 33 sufficiently wide that the plates are spaced sufficiently far apart to permit the support to move freely therebetween.

I am able to utilize the rear windows for a rear wind shield by not extending the inner rail the whole length of the car. For this purpose, the rear window is moved forwardly until the front slide block 12 escapes from the forward end of the inner rail 9, then the rear window is turned about its rear slide block, which is still suspended from the rail, and can turn freely, and the screw head turns in the block remaining on the rail, until it extends in a transverse direction to the car, then the front block is caused to engage a single rail 38 suspended from a cross beam 39 and extending transversely in the middle portion of the car only a short distance. The ends of said cross beam 38 are passed through sufficiently large holes in the inner plates 3 and are secured in the presser bar 7 between the pairs of plates.

40 indicates a stop at the front end of the outside rail, or track, to prevent the slide blocks from moving off said rail. 41 indicates a pin or stop for limiting the upward movement of the presser bar 7 due to the action of the springs 21.

In the form of track and presser bar shown in Fig. 10, the rails are made of a pressed metal 43 fastened by screws 44 to the support 7 of the track.

In order to securely attach the window 18 to its supporting screw 17, there is interposed between the sides of the sheet metal frame 15 of the window an extra piece of metal 20, which, being pinned to the sheet metal frame by the pins 25, serves to connect the top side of the sheet metal frame to the vertical sides, as clearly shown in Fig. 3. This extra piece of metal also provides additional body for the screws 17 to be screwed into.

I claim:

1. The combination with an automobile body and a top therefor, of guides secured to the top, substantially horizontal presser bars movable up and down between the guides, means for yieldingly holding said presser bars in up position, windows movable longitudinally over the body and manually operated means for depressing the presser bars and applying a yielding and holding pressure to the windows.

2. In an automobile, the combination of a window, the lower edge of which is adjacent to the upper edge of the body of the automobile, a longitudinal track, the upper edge of the window being provided with means adapted to slide along said track, means for raising said track to raise the lower edge of the window from off the upper edge of said automobile body, and means for depressing said track to press said lower edge against the upper edge of said body.

3. In an automobile, the combination of a window, the lower edge of which is adjacent to the upper edge of the body of the automobile, a longitudinal presser bar, the upper edge of the window being provided with means adapted to slide along said bar, means for resiliently raising said bar to raise the lower edge of the window from off the upper edge of said automobile body, and means for depressing said bar to press said lower edge against the upper edge of said body.

4. In combination with the top of an automobile and a frame therefor, guides secured to said frame in said top, a presser bar movable up and down relative to said guides, window tracks secured to said presser bar, springs for raising said presser bar and means for depressing said presser bar against said springs.

5. In combination with the top and body of an automobile, of a guide secured to said top, a presser bar movable up and down with respect to the guide, windows slidable longitudinally with relation to the body, springs for raising said presser bar and manually operated means for exerting a resilient pressure on the bars at a plurality of points against the action of said springs, to hold the windows against sliding.

6. In combination with the top and body of an automobile, of a guide secured to the top, a presser bar movable up and down with respect to the guide, a window slidable longitudinally relative to the body and top, resilient means for raising said presser bar and manually operated means for applying a resilient pressure on the bar against the action of the springs and depressing said bar to hold the windows against sliding.

7. The combination with the top and body elements of an automobile, of a presser bar movable up and down with relation to the top, a window slidable between the top and body, spring means operatively associated with the top and arranged so as to normally lift the window from the body and means for depressing the presser bar to apply pressure to the window to hold it against sliding.

8. The combination with the top and body elements of an automobile, of a presser bar movable up and down relative to the top, a window slidable between the top and body, spring means normally lifting the window and presser bar and means for depressing the presser bar so as to apply a holding pressure to the window.

9. The combination with the top and body elements of an automobile, of a guide associated with the top, a presser bar movable up and down with respect to the guide, a window slidable between the top and body, spring means operatively associated with the guide and window to normally lift the window from the body and means for depressing the presser bar to apply a non-sliding pressure to the window.

10. The combination with the top and body elements of an automobile, of a window slidable between the top and body elements, spring means operatively associated with the top and normally supporting the window in position to permit free sliding of the window, a presser bar movable against action of said spring means into position to apply a yielding pressure to the window and manually operated means for so moving said presser bar.

AUGUST H. PAPE.